United States Patent
Morrison et al.

[11] Patent Number: 5,854,903
[45] Date of Patent: Dec. 29, 1998

[54] OPTIMIZATION METHOD FOR ROUTING AND LOGICAL NETWORK DESIGN IN MULTI-SERVICE NETWORKS

[75] Inventors: John A. Morrison, New Providence; Kajamalai Goplaswamy Ramakrishnan, Berkeley Heights; Debasis Mitra, Summit, all of N.J.

[73] Assignee: Lucent Technologies Inc., Murray Hill, N.J.

[21] Appl. No.: 554,502

[22] Filed: Nov. 7, 1995

[51] Int. Cl.[6] .................................................. G06F 13/00
[52] U.S. Cl. ........................ 395/200.79; 395/200.62; 395/200.68; 395/200.72; 370/351; 370/388
[58] Field of Search .................... 395/200.02, 200.68, 395/200.69, 200.7, 200.62, 200.63, 200.79; 370/60, 381, 72, 388; 364/DIG. 1

[56] References Cited

U.S. PATENT DOCUMENTS

| | | | |
|---|---|---|---|
| 5,287,535 | 2/1994 | Sakagawa et al. | 370/60 |
| 5,289,303 | 2/1994 | Cloonan et al. | 359/139 |
| 5,345,444 | 9/1994 | Cloonan et al. | 370/60 |
| 5,633,859 | 5/1997 | Jain et al. | 370/234 |

OTHER PUBLICATIONS

Chung et al., "Reduce Load Approximations for Multirate Loss Networks" IEEE, pp. 1222–1231, Aug. 8, 1993.

*Primary Examiner*—Alyssa H. Bowler
*Assistant Examiner*—Dzung C. Nguyen

[57] ABSTRACT

A method is described for network optimization based on a multirate, circuit-switched analysis. Network loss probabilities are determined as a solution of a set of fixed point equations and the sensitivity of network performance, as a function of offered load and loss probabilities, is determined as a solution to a set of linear equations. Because the numerical complexity of solving both the fixed point equations and the sensitivity equations is of an order which renders an exact solution computationally intractable, an asymptotic approximation is applied which yields a solution to the network loss probabilities and network sensitivities. A global optimization procedure is then applied using an iterative, steepest ascent optimization procedure to yield a set of virtual path routings and capacity allocations.

54 Claims, 6 Drawing Sheets

5,854,903

OPTIMIZATION METHOD FOR ROUTING AND LOGICAL NETWORK DESIGN IN MULTI-SERVICE NETWORKS

FIELD OF THE INVENTION

This application is related to communications networks carrying multi-service traffic and more particularly to a method for logical network design in such a network.

BACKGROUND OF THE INVENTION

Networks are a principal means of exchanging or transferring information (e.g., data, voice, text, video, etc.) among communications devices (i.e., devices for inputting and or outputting information such as computer terminals, multimedia workstations, fax machines, printers, servers, telephones, videophones, etc.) connected to the network(s).

A network typically comprises switching nodes connected to each other, and to communication devices, by links. Each link is characterized by a bandwidth or link capacity. Information input from the communication devices to the network may be of any form but is often formatted into fixed-length packets or cells. When information is to be exchanged between two communications devices, a path is established within the network connecting the nodes (hereafter called the origination and destination nodes) with which those devices are associated.

In many networks, a given communications stream[1] between a specified origin and destination is carried over a set of physical paths (i.e., paths comprising the origin and destination nodes, possibly one or more intermediate nodes, and links connecting the included nodes) within the network. The set of origin-to-destination paths, wherein each path is characterized by a predetermined bandwidth, are generally referred to as "logical" or "virtual" paths. It will also be the case that several such virtual paths may co-exist along all or some part of a physical path within a network. Although typically a number of different physical paths could be chosen initially to constitute such a virtual path, once the virtual path is established, the chosen physical paths generally remain established for the given communications stream.

[1] The term "communications stream" refers to information exchanged between communications devices which are connected to a network at an origination and a destination node.

It should be noted as well that logical paths, and the grouping of such logical paths into one or more logical sub-networks can characterize both a network having a fixed and more-or-less permanent set of logical subnetworks for serving various users of such a network, and, as well, a network wherein the logical subnetworks comprising such a network are re-dimensioned from time-to-time to serve changing traffic requirements.

An important element of logical network design is the process of selecting a set of physical paths through the network having sufficient capacity for carrying the estimated traffic of a communications stream. This process may take into account various factors such as the network topology and current available network resources (e.g., buffer space in the nodes and capacity in the links), and any quality of service commitments (e.g., guaranteed bandwidth or maximum cell loss probability) made to users of the network.

Asynchronous Transfer Mode (ATM) is a networking protocol which will often be applied in the networks described above, and which is designed to efficiently support high speed digital voice and data communications. High speed communication networks based on ATM will integrate a multitude of services with different traffic characteristics. These characteristics will range from constant bit rate to highly bursty, variable bit rate. Effective bandwidth is an important concept in the translation of variable bit rate traffic from the context of buffered transmission to constant bit rate traffic in unbuffered transmission facilities. This effective bandwidth concept is considered in detail in a pending U.S. Patent Application of one of the inventors, entitled: "A METHOD FOR ADMISSION CONTROL AND ROUTING BY ALLOCATING NETWORK RESOURCES IN NETWORK NODES," Application Ser. No. 08/506160.

With such an effective bandwidth translation, ATM networks may be viewed, at least for the purpose of handling calls, as multirate circuit-switched, loss networks in which the description of each service includes a characteristic bandwidth requirement or rate for each link which carries the service. On the surface, such a translation appears to offer an opportunity for network analysis using prior-art techniques, since there exists a substantial body of prior work on single-rate, circuit switched network design [See, for example, A. Girard, *Routing and Dimensioning in Circuit-Switched Networks,* Addison-Wesley, 1990, and G. R. Ash, R. H. Cardwell, and R. P. Murray, "Design and optimization of networks with dynamic routing", *Bell Syst. Tech. J.,* 60(8):1787–1820, October 1981] However, upon further examination, it can be seen that there are various features which make the network design problems—particularly, as related to capacity allocation and routing for virtual paths—for the multi-rate, multi-service characteristics associated with ATM networks substantially different and more formidable from those treated by the prior art.

Three such features are of particular note. First, switched virtual circuits, in contrast to permanent virtual circuits, have random arrivals and random holding times, thus necessitating design procedures which take into account such randomness. A second characteristic is related to size of the network links. Consider, as an illustrative example, a link with bandwidth 150 Mbps, which carries traffic of various services with the smallest service rate being 8 Kbps. In the circuit switched model such a link is viewed as having 18,750 circuits—considering the smallest service rate as being equivalent to a single circuit. Since high speed optical transmission links can carry 2.5 Gbps, the link capacity in circuits, which is denoted herein generically by C, is expected to be very large in future networks. (Note that link capacity C may equivalently be expressed in bandwidth.) The second noteworthy feature is that the number of services, S, can be expected to be in the range 10–25 in the near future, and much higher over the intermediate term—particularly as the "information superhighway" increasingly approaches reality. With these large capacity and service parameters which characterize contemporary and expected future multi-service and multi-rate networks, such as ATM networks, an attempt to apply prior-art network analysis methods to these networks would be computationally intractable.

SUMMARY OF INVENTION

A method is provided for network optimization based on a multirate, circuit-switched analysis. According to the method of the invention, network loss probabilities are determined as a solution of a set of fixed point equations and the sensitivity of network performance, as a function of offered load and loss probabilities, is determined as a solution to a set of linear equations. Because the numerical complexity of solving both the fixed point equations and the sensitivity equations is of an order which renders an exact solution computationally intractable, an asymptotic approximation is applied which yields a solution to the network loss probabilities and network sensitivities. A global optimization procedure is then applied using an iterative, steepest ascent optimization procedure to yield a set of virtual path routings and capacity allocations.

As a further embodiment of the invention, a unified hybrid approach is provided which allows asymptotic and nonasymptotic (exact) methods of calculations to be used cooperatively. And as a still further embodiment of the invention, a methodology is provided for carrying out the network optimization procedure of the invention with changing traffic conditions.

A software embodiment of the invention is also provided for automatically carrying out the optimization methodology of the invention with respect to both static and dynamic traffic conditions.

DETAILED DESCRIPTION

Notation and Nomenclature

The discussion following will be presented partly in terms of algorithms and symbolic representations of operations on data bits within a computer system. As will be understood, these algorithmic descriptions and representations are a means ordinarily used by those skilled in the computer processing arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

Introduction

The following detailed description of the invention is divided into a number of sections. Section 1 provides a brief overview of the environment in which the methodology of the invention may be practiced. Section 2 provides a description of the methodology of the invention, while Section 3–8 are addressed to a rigorous development of the inventive methodology. Section 9 describes a software embodiment of the invention for automatically carrying out the network optimization methodology of the invention, while Section 10 provides illustrative results of applying the inventive methodology in exemplary network circumstances.

1. Environment

Figure 1:
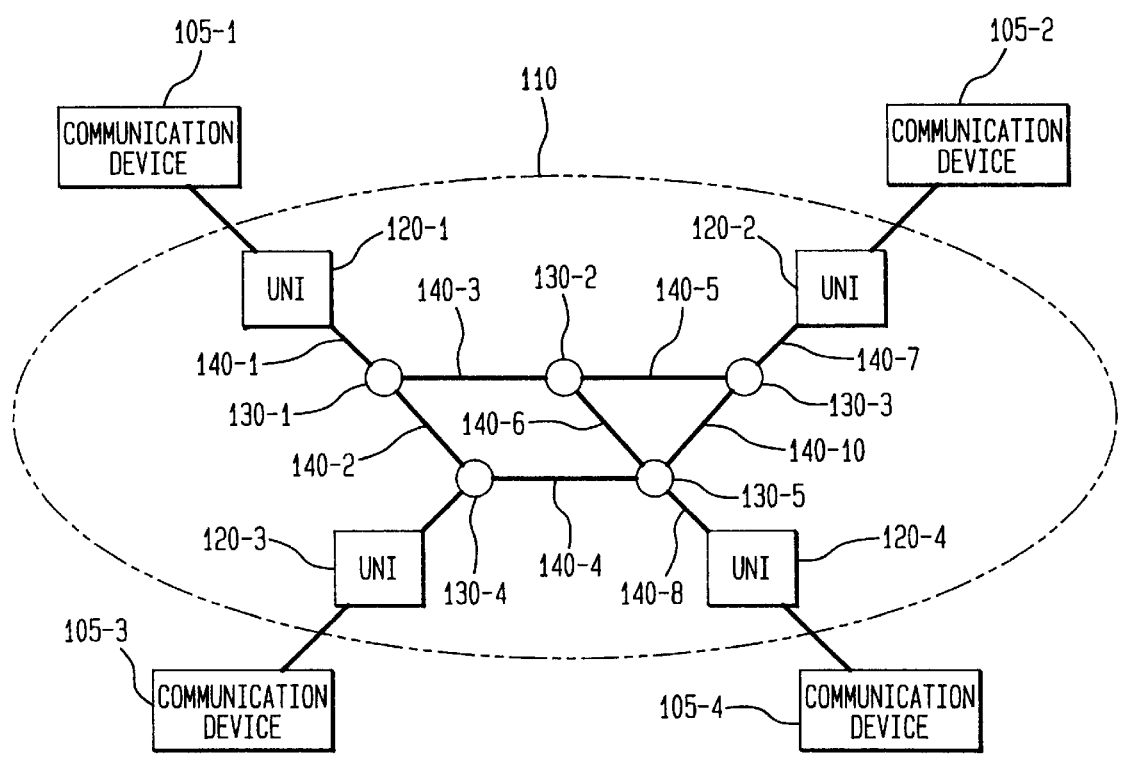
FIG. 1 illustrates a data network in which the inventive method of the invention may be practiced.

FIG. 1 illustrates a network in which the inventive method of logical network design may be carried out. Network 110 comprises a plurality of switching nodes 130-$i$ and links 140-$k$. Each communications device 105-$j$ has an associated user network interface 120-$j$. That user network interface may include an access regulator, which regulates the flow or rate of information from communications device 105-$j$ into network 110 according to a function characterized by a set of parameters. Each communications device 105-$j$ generates information for use by, or receives information from, other communications devices in the network. The term "information" as used herein is intended to include data, text, voice, video, etc. Information from communications device 105-$j$ is characterized by a set of transmission and/or rate parameters related to network requirements needed to accommodate transmission of such information. In particular, as respects variable bit rate communications sources, it is to be noted that the bandwidth requirements of such sources typically vary with time. Thus, as pointed out earlier, in order to accommodate a network analysis requirement for a fixed set of transmission parameters for a given information transmission, a translation using the previously referenced effective bandwidth concept is applied.[2]

[2] Because the effective bandwidth determined for a variable bit rate source is a function of the level of buffering available in a particular network route, a characteristic of the invention, and particularly the software embodiment thereof, is a matching of the effective bandwidth for such a source with the buffering available in a selected network route.

In the design and operation of an information network, such as network 110, a concept that is frequently applied is that of a logical or virtual path connecting devices associated with a given origin and destination node pair for a given service, along with the extended form of such a virtual path, a logical or virtual sub-network. The basic idea of a virtual path or virtual subnetwork is that of a logical partitioning of a physical network into a number of virtual sub-networks or paths generally serving different users and/or services. A virtual path will ordinarily traverse a number of nodes and connecting links between an origin node and a destination node, and an important characteristic of such a virtual path is that of a dedicated connection (i.e., non-switched) being made at each of the intermediate nodes. It should also be noted that such a logical path or sub-network may follow a number of different physical paths through the network (subject to the constraint that the terminal points of the virtual path or sub-network must correspond with the corresponding terminal points in the physical network). Moreover, at least in general, multiple virtual paths (or segments of multiple virtual sub-networks) will share capacity in one or more common physical links.

For a multi-service network, each service will normally have an associated virtual path (of specified bandwidth capacity) established for each served origin-destination node pair.[3] For a given service, particular communications transactions between a served communications device at an origin node and a communications device at a destination node (hereafter, "calls") occupy a virtual connection or virtual circuit within the virtual path connecting the origin and destination nodes. As will be apparent, the total of the bandwidth requirements for all of the virtual circuits which are in use within a virtual path at any point in time must be less than or equal to the bandwidth established for that virtual path.

[3] It should be noted that a virtual path for a particular service offered between defined end points could also be implemented as two or more serially connected virtual paths, where a switched connection occurs at intermediate nodes representing end points for such serially connected virtual paths.

Logical partitioning of a physical network in accordance with the concepts discussed above will in general provide a more efficient utilization of network resources, compared to the use of separate physical networks or paths for each such user or service. Nonetheless, because each logical path or subnetwork will have a certain amount of dedicated bandwidth, it is entirely possible that one (or more) virtual paths or sub-networks will be carrying a level of traffic well below the bandwidth capacity of the logical partition, while another logical partition (possibly using the same physical link) will be in a blocking condition because all of its available bandwidth is in use. The achievement of a close correspondence between the transmission requirements of a communications stream and the sizing of a virtual path used by that communications stream is an important accomplishment of the methodology of the invention.

In the remaining discussion in this section, references to such logical partitions in a network will be addressed in terms of virtual paths (or, as appropriate, virtual circuits). However, it will be understood that the principles illustrated in that discussion apply equally to virtual sub-networks.

To illustrate the operation of the network 110, consider, for example, an intended call from communications device 105-1 to communications device 105-2. Initially, communications device 105-1 will request a virtual circuit from the network to provide a connection to communications device 105-2. For the virtual path in which the requested virtual circuit will be established, the physical path through the network will comprise a set of nodes and a set of links between the user network interfaces associated with communications devices 105-1 and 105-2. One such routing in network 110 for a virtual path between communications devices 105-1 and 105-2 would comprise nodes 130-1, 130-2 & 130-3 and links 140-1, 140-3, 140-5 & 140-7.

In the selection of viable network routes for the virtual path in which the requested virtual circuit will be implemented, it is important to note that some, or possibly all, of the nodes 130-$i$ may have associated therewith at least one buffer of a predetermined size,[4/] and that each link 140-$k$ has associated with it a predetermined traffic-handling capacity, which may be described in terms of bandwidth or of circuit equivalents. Thus, before the set of physical paths comprising the virtual path associated with the requested service can be determined, both the network resources required by that virtual path and the network resources available along all physical paths potentially useable for connecting the end points to be served by that virtual path must be known. As will be apparent, a routing of such a virtual path through the network will require that network resources be available which can be dedicated to that virtual path for the duration of the associated service.

[4/] In general such buffers provide temporary storage for cells in transit between communications devices pending sufficient bandwidth becoming available on subsequent links along the path.

2. Description of Methodology of Invention

The inventive method is described herein in terms of a preferred embodiment of the invention—optimization of network performance in ATM network design. Specifically, the focus of the methodology of the invention in this embodiment is the sizing and routing of virtual paths within a multi-service network (where each virtual path is associated with a particular service offered between a specified origin and destination) and the determination of rates of traffic offered to various routes connecting origin-destination node pairs, for the achievement of optimum network performance. In this embodiment, maximization of network revenue is chosen as a proxy for such optimum network performance. As will be apparent, the objective of this embodiment of the inventive methodology may alternately be viewed as one of optimally sizing the virtual path network.

A principle aspect of the methodology of the invention is the systematic incorporation of asymptotics in various stages of the computations in multirate network design. Additionally, a unified, hybrid framework is provided which allows asymptotic and nonasymptotic (sometimes referred to herein as "exact") techniques to cooperate and complement each other. A central element in the asymptotic approach is the uniform asymptotic approximation (UAA) developed by two of the inventors for the analyses of single links. That analysis is described in D. Mitra and J. A. Morrison, "Erlang capacity and uniform approximations for shared unbuffered resources", *IEEE/ACM Trans. Networking*, 2:558–570, 1994.

An initial step in the method of the invention is the determination of network loss probabilities which are computed based on the well-known fixed point approach. That fixed point approach is described, inter alia, by Kelly [F. P. Kelly, "Loss networks," *Ann. Appl. Prob.*, 1:319–378, 1991], Whitt [W. Whitt, "Blocking when service is required from several facilities simultaneously," *AT&T Tech. J.*, 64:1807–1856, 1985], Girard [A. Girard, Routing and Dimensioning in Circuit-Switched Networks, Addison-Wesley, 1990] and Ross [K. W. Ross, *Multirate Loss Models for Broadband Telecommunications Networks*, Springer, 1995]. The complexity of calculating blocking using the fixed point approach on a link carrying multirate traffic is $O(C)$ by use of the well-known, exact calculations due to Kaufman [J. S. Kaufman, "Blocking in a shared resource environment" *IEEE Trans. Commun.*, COM-29:1474–1481, 1981] and Roberts [J. W. Roberts, "Teletraffic models for the Telecom 1 integrated services network," *ITC-10, Session 1.1*, paper #2]. By contrast, the complexity of calculating blocking on such a link by the UAA approach of the method of the invention is $O(1)$, i.e., bounded, fixed as $C \rightarrow \infty$.

A next step in the inventive methodology is addressed to a determination of the sensitivity of network performance, as a function of offered load and loss probabilities. In a preferred embodiment of the invention, network revenue is used as a proxy for network performance. In that preferred embodiment, the calculation of network revenue sensitivity utilizes the notion of implied costs which has been taught by Kelly, et al. [See, e.g., F. P. Kelly, "Routing in circuit-switched networks: Optimization, shadow prices and decentralization," *Adv. Appl. Prob.*, 20:112–144, March 1988; F. P. Kelly, "Fixed point models of loss networks," *J. Austral. Math. Soc. Ser. B*, 31:204–218, 1989; A. Farago, S. Blaabjerg, L. Ast, G. Gordos, and T. Henk, "A new degree of freedom in ATM network dimensioning: optimizing the logical configuration," To appear in *IEEE J. Selected Areas in Communications*, September 1995; S.-P. Chung and K. W. Ross, "Reduced load approximations for multirate loss networks," *IEEE Trans. Commun.*, 41:1222–1231, 1993]. The equations for the determination of implied costs are obtained by extending the approach of Kelly to the multirate case. The exact equations for the implied costs in the multirate network are linear with dimension SL, where L is the number of links in the network, and S the number of services. Hence the complexity of solving these equations is $O(S^3L^3)$. Since both L and S are likely to be of significant magnitude in contemporary and future networks, the computational resources for finding an exact solution for these equations are generally unrealizable in a practical setting. With the application of the UAA to the solution of these equations according to the method of the invention, a particular product-form structure is realized for the sensitivity of links, which is used subsequently to reduce the number of linear equations for the network's implied costs to only L. Thus the complexity of solving these implied cost equations is reduced to $O(L^3)$, a key advantage of the method of the invention. The importance of speed (or, alternatively, reduced complexity) for the solution to link analysis equations will be easy to appreciate when one considers that each network design and optimization problem requires many network solutions, each network solution requires many iterations and each iteration requires L link analyses.

The network revenue function will generally not be concave and, accordingly, the inventive method incorporates repeated applications of the steepest ascent optimization procedure from various initial conditions. In order to calibrate the quality of the best solution obtained, it is desirable to have bounds on the optimal revenue, and a bounding procedure is provided as one aspect of the invention. That bounding procedure incorporates an upper bound which is obtained by maximizing revenue in a corresponding deterministic, multirate multicommodity flow problem.

A further embodiment of the invention is provided to address the expected case that networks will, at least occasionally, have some links that are not large. Because the asymptotic techniques which characterize the principal methodology of the invention work best in a regime of large C and reasonably large S, a hybrid approach is provided for application in such a circumstance, which hybrid approach combines asymptotic and nonasymptotic techniques.

As discussed heretofore, with contemporary networks, it will be desired to re-dimension the network from time-to-time to accomodate changing traffic conditions. The method of the invention described to this point is, however, addressed to a static network condition—i.e., a determination of optimal path sizing and input traffic allocations in a network for a fixed set of input conditions. Accordingly, as an additional embodiment of the invention, a methodology is provided for the real-time adaptation of the sizes of routes or virtual paths to changing traffic loads. In the described embodiment, the primary burden of the needed network resizing is the determination of new implied costs to reflect the altered traffic loads. To that end, an iterative algorithm for solving the equations for the implied costs is provided, which uses the prior implied costs as starting values.

2A. Network Model For Methodology of Invention

The network model for the application of the inventive methodology may be considered as a network with N nodes and L links which connect pairs of nodes, where link $\ell$ has capacity $C\ell$. With this model there are S types of service, where service s requires bandwidth $d_s\ell$ on link $\ell$. The script letters $\mathcal{L}$, $\aleph$, and $\mathcal{S}$ will denote the corresponding sets. It is assumed that $C_{z,1}$, $\ell=1,2,\ldots,L$ and $d_s\ell$, $s=1,2,\ldots,S$. $\ell=1,2,\ldots,L$ are positive integers. An origin-destination pair of nodes will be denoted by $\sigma$, and a stream of calls of service type s from the origin node to the destination node is denoted by $(s, \sigma)$. The arrivals for stream $(s, \sigma)$ are Poisson, with mean rate $\Lambda_{s\sigma}$. The set of admissible routes for stream $(s, \sigma)$ is denoted by $\mathfrak{R}(s,\sigma)$. The route sets $\{\mathfrak{R}(s,\sigma)\}$ are assumed to be given and fixed. An arriving call may or may not be offered to the network, based on the outcome of an independent Bernoulli trial, which has parameters to be determined by the design process. This call admission control policy implemented by the method of the invention operates to block arriving traffic from entry to the network in accordance with defined blocking criteria—e.g., overall network in blocking condition, or a portion of network capacity reserved for anticipated higher value traffic. The blocking probability for this call admission control policy can be stated as $$p_{s,\sigma} = \frac{1}{\Lambda_{s,\sigma}} \sum_{r \in \mathfrak{R}(s,\sigma)} \lambda_{s,r}$$

If an arriving call in stream $(s, \sigma)$ is offered to a route $r \in \mathfrak{R}(s,\sigma)$ it may be blocked and lost if there is insufficient bandwidth available on each link of the route r. If the call is accepted, the bandwidth on each link is simultaneously held for the duration of the call. The holding period of a call in stream $(s, \sigma)$ is generally distributed with mean $1/\mu_{s\sigma}$ and is independent of earlier arrival and holding times.

As with stream $(s, \sigma)$, the call arrivals of service type s on route $r \in \mathfrak{R}(s,\sigma)$ are Poisson, with mean rate $\lambda_{sr}$, where $$\sum_{r \in \mathfrak{R}(s,\sigma)} \lambda_{sr} \leq \Lambda_{s\sigma} \qquad (2.1)$$

The corresponding traffic intensity is $$\rho_{sr} = \frac{\lambda_{sr}}{\mu_{sr}}, \forall r \in \mathfrak{R}(s, \sigma) \qquad (2.2)$$

It follows, from (2.1) and (2.2), that $$\sum_{r \in \mathfrak{R}(s,\sigma)} \rho_{sr} \leq \frac{\Lambda_{s\sigma}}{\mu_{s\sigma}} \qquad (2.3)$$

Where the sum of the $\rho_{s,r}$s in the left hand side of (2.3) is less than the right hand term in that equation, the differential will be attributable to an application of the call admission control policy of the method of the invention.

2B. Network Design: Offered Traffic on Routes which Maximize Revenue

From this network model, the algorithmic formulation for the methodology of the invention can be described. Note that this formulation is addressed to the preferred embodiment, where network optimization is implemented as a revenue maximization for offered traffic. In this formulation, the revenue earned per carried call per unit time by calls of service type s on route r is denoted by $e_{sr}$, and the loss probability of service s on route $r \in \mathfrak{R}(s,\sigma)$ is denoted by $L_{sr}$. The long-run average revenue for the network can then be stated as $$W = \sum_{\sigma,s} \sum_{r \in \mathfrak{R}(s,\sigma)} e_{sr}\rho_{sr}(1 - L_{sr}) \qquad (2.4)$$

The optimization goal of the invention is to maximize that long term average revenue, subject to the constraint (2.3), i.e., max W $$\rho_{sr}: \sum_{r \in \mathfrak{R}(s,\sigma)} \rho_{sr} \leq \Lambda_{sr}/\mu_{sr} \, \forall s, \forall \sigma; \rho_{sr} \geq 0 \qquad (2.5)$$

It can be seen that (2.4)–(2.5) is an optimization problem with linear constraints (2.5) and a nonlinear objective function (2.4). To evaluate W for given offered traffic rates $\rho_{sr}$, it is necessary to analyze the network for the loss probabilities $L_{sr}$. However, as is known, the dependence of the loss probabilities on the offered traffic rates is complicated—i.e., the so-called "knock-on effects", where small changes in traffic loading for one part of a network may have repercussions over a large area of the network. Accordingly, the optimization algorithm must be iterative. A particular initial condition which may be used is $\rho_{sr}=0$, $\forall s \in S$ and $r \in \Re(s,\sigma)$, $\forall \sigma$. Of course, various other initial conditions may also be used, including uniform splitting of traffic among all routes with the minimum number of hops.

In the optimization algorithm, the network is analyzed to obtain W and $\partial W/\partial \rho_{sr}$, using the techniques described generally herein and in more detail in the sections following. A steepest ascent direction is then computed by projecting $\partial W/\partial \rho_{sr}$ on to the null space of (2.5). This provides a direction in which to move. The algorithm then searches along this direction vector for an improving solution, and restarts the iterative process, until a local maximum of (2.4) is obtained.

The specific steps carried out by the optimization algorithm are given below:

Optimization Algorithm:

Offered Traffic on Routes which Maximize Revenue input: N; L; S; $C_{z,1}$, $1 \leq \ell \leq L$; $d_s\ell$; $1 \leq s \leq S$, $1 \leq \ell \leq L$;
$\Re(s,\sigma)$, $1 \leq s \leq S$, $\sigma \in \aleph \times \aleph$; $\Lambda_{s\sigma}$, $\mu_{s\sigma}$, $1 \leq s \leq S$, $\sigma \in \aleph \times \aleph$;
$e_{sr}$, $\rho_{s,r}^{(0)}$, $1 \leq s \leq S$, $r \in \Re(s,\sigma)$, $\sigma \in \aleph \times \aleph$;.

output: $W^*$, the (locally) optimum revenue, and $\rho^*_{sr}$, the (locally) optimum rates of traffic offered to routes.

1. Initialize: $k \leftarrow 0$
   evaluate $W^{(0)}$
   not_converged $\leftarrow$ true
2. While (not_converged) do
   2.1 $L_{sr}$, $\partial W/\partial \rho_{sr} \leftarrow$ Network_Solve (N,L,S, $C\ell$, $d_s\ell$, $\Re(s,\sigma)$, $\rho_{sr}^{(k)}$, $e_{sr}$)
   2.2. $d \leftarrow$ Null_space_project ($\partial W/\partial \rho_{sr}^{(k)}$)
   2.3 $\rho_{sr}^{(k+1)} \leftarrow$ Line_search ($\rho_{sr}^{(k)}$, d)
   2.4. evaluate $W^{(k+1)}$
   2.5. if $(W^{(k+1)}-W^{(k)})/W^{(k)} \leq \epsilon$, not_converged $\leftarrow$ false
   2.6. $k \leftarrow k+1$
end_while In FIG. 2, the steps in carrying out the methodology of an embodiment of the invention are shown in flow-chart form. As indicated in the figure, the process begins with an initial routing determination and capacity allocation for a set of virtual paths in a network (Step 10). As a next step in the process (Step 20), network blocking probabilities and network sensitivities are determined based on a virtual path routing and capacity allocation provided as an input to that step—initially, the initial such factors determined in Step 10. In the following step (30) the network sensitivities, which are related to blocking probabilities and offered load, are evaluated with respect to a network performance criterion. A decision step is then carried out (Step 40) to compare the result of the evaluation in Step 30 with the result for a prior iteration (or with an arbitrary value in the case of a first iteration. If the incremental change is less than a threshold amount, the process terminates and the input virtual path routings and capacity allocations are accepted as an optimum. If the incremental result exceeds that threshold amount, a further step is carried out (Step 50) wherein a new set of virtual path routings and capacity allocations are generated based on the blocking probabilities and network sensitivities determined in Step 20. That new set of virtual path routings and capacity allocations then form an input to Step 20 for a next iteration of the process.

2C. Constraint Due To Switch Capacity

With the method of the invention, an additional constraint can incorporated in the logical network design optimization process—to wit: constraints imposed by the capability of the switches located at the network nodes to handle signalling and processing (such as database transactions for bandwidth availability) tasks during call setup. As is known, individual switches can process calls only up to a specific maximum rate. Such constraints are quite different from constraints implied by the traffic handling capacity of transmission links, which are already accounted for by the previously described formulation of the inventive methodology. The circumstance can arise, however, that in certain cases where many traffic streams converge on to a switch, the call processing capacity of that switch is the binding constraint in determining the carried traffic. With the methodology of the invention, as particularly realized in the software embodiment described hereafter, such switch call processing capacity constraints are incorporated in the general network performance optimization procedure described by (2.5).

For each switch (i.e., node) i in the network, let $\Re_i$ be the set of all routes either originating at or transiting through (but not terminating at) node i. These sets can be readily obtained by application of well-known set operations on the original route sets $\Re(s,\sigma)$ for all services s and origin-destination pairs $\sigma$. Let $P_i$ denote the maximum call processing rate or capacity for switch i. These switch constraints may then be expressed in the following linear form:

$$\sum_s \sum_{r \in \Re_i} \lambda_{s,r} \leq P_i \; \forall i \qquad (2.5S)$$

As will be understood, this constraint augments the constraint of (2.5). It is straightforward to modify the optimization (or design) procedure to reflect the augmented constraints.

2D. Bandwidth allocation

With the completion of the network optimization procedure, a further step in the methodology of the invention is the allocation of bandwidth among the virtual paths comprising the network design. As previously indicated, a virtual path for a traffic stream (s,r) is constituted from a list of network links connecting the origin and destination for that stream and a bandwidth allocation on each of those links. At the completion of the optimization procedure, the following data are available (and are provided as an output from the software embodiment of the invention): (i) $v_s\ell$;r, the thinned load of stream (s,r) offered to link $\ell$ (see (3.9) hereafter), and (ii) $B_s\ell$, which is the loss probability of service s on link $\ell$ (see (3.2) hereafter. From these two quantities, $v_s\ell$;r and $B_s\ell$, and the bandwidth requirement per call, $d_s\ell$, it is a simple and well-known procedure, often referred to as an Inverse Erlang, to obtain the compatible bandwidth allocation for stream (s,r) on link $\ell$. Let $C_s\ell$;r denote this quantity.

Thus, the virtual path for stream (s,r) is made up of a sequence of links, $\ell$, for each of which is allocated a nominal capacity or bandwidth of $C_s\ell$;r.

In this Section 2 the method of the invention has been described from the perspective of the overall framework of the invention. Sections 3–8 following provide a more rigorous treatment of the various steps in the method of the invention, particularly as to the development of the underlying equations and algorithms for those steps.

3. Network Analysis

3A. Development of Fixed Point Equations

The fixed point equations are derived on the basis of the well known link independence assumption. Each route which uses link $\ell$ contributes a load to link $\ell$, which is Poisson with rate which is reduced by independent thinning by all other links in the route. Let $B_s\ell$ denote the loss probability of service s calls on link $\ell$. As in the prior section, link $\ell$, has capacity $C\ell$ and service s requires bandwidth $d_s\ell$. Let $v_s\ell$ be the reduced load obtained after thinning of service type s calls offered to link $\ell$, and let $$d\ell = (d_1\ell, \ldots, d_{SL}), v\ell = (v_1\ell, \ldots, v_S\ell). \tag{3.1}$$

Then, $$B_s\ell = L_s(d\ell, v\ell, C\ell) \tag{3.2}$$

where the functions $L_6$ may be calculated exactly by means of the recursion derived independently by Kaufman [J. S. Kaufman, "Blocking in a shared resource environment," *IEEE Trans. Commun.*, COM-29:1474–1481, 1981] and Roberts [J. W. Roberts, "Teletraffic models for the Telecom 1 integrated services network," *ITC*-10, Session 1.1, paper #2]. The complexity of calculating $B_{s\ell}$ by this procedure is $O(C)$ as $C \to \infty$.

With the link independence assumption, the reduced load is given by $$v_s\ell = \sum_{\sigma} \sum_{r \in \mathfrak{R}(s,\sigma): \ell \in r} \rho_{sr} \prod_{m \in r-\{\ell\}} (1 - B_{sm}) \tag{3.3}$$

The fixed point equations for the network may be summarized as follows.

$$B_s\ell = \Phi_s\ell(v\ell), (s=1, 2, \ldots, S; \ell=1, 2, \ldots, L), \tag{3.4a}$$

$$v = \Psi(B) \tag{3.4b}$$

where $v = \{v_s\ell\}_{s,l}$ and $B = \{B_s\ell\}_{s,\ell}$. The function $\Phi_s\ell$ is obtained by fixing $d\ell$ and $C\ell$ in (3.2); $\Psi$ is defined by (3.3).

The method of successive approximation may be used for solving (3.4). This method starts with initial values $v\ell^{(0)}$ and iterates, i=0, 1, 2, ...

$$B_s\ell^{(i+1)} = \Phi_s\ell(v\ell^{(i)}), (\ell=1, 2, \ldots, L)$$

$$v^{(i+1)} = \Psi(B^{(i+1)}) \tag{3.5}$$

until a convergence criterion is satisfied.

Under the link independence assumption, the loss probability $L_{sr}$ of service s on route r is $$L_{sr} = 1 - \Pi \ell_{er} (1 - B_s\ell); r \in \mathfrak{R}(s, \sigma) \tag{3.6}$$

3B. Determination of Implied Costs

From (3.2) and the explicit expression for $L_s$ (see, for instance, Kaufman, id.), the following relation is obtained:

$$\frac{\partial B_s\ell}{\partial v_{t\ell}} = (1 - B_{t\ell})[L_s(d\ell, v\ell, C\ell - d_{t\ell}) - L_s(d\ell, v\ell, C\ell)] \tag{3.7}$$

The revenue sensitivity to the offered loads, and equations for the implied costs, may be determined by extending the approach of Kelly [F. P. Kelly, "Fixed point models of loss networks," *J. Austral. Math. Soc. Ser. B*, 31:204–218, 1989] to the multirate case. This extension has been made in a contemporaneous article of the inventors [D. Mitra, J. A. Morrison, and K. G. Ramakrishnan, "Unified approach to multirate ATM network design and optimization," To be published November, 1995] and independently by Faragò et al. [A. Faragò, S. Blaabjerg, L. Ast, G. Gordos and T. Henk, "A new degree of freedom in ATM network dimensioning: optimizing the logical configuration," *IEEE J. Selected Areas in Communications*, 13: 1199–1206, September, 1995].

The sensitivity of the revenue W with respect to the offered load $\rho_{sr}$, when the revenue is calculated from the solution of the fixed point equations, is $$\frac{\partial W}{\partial \rho_{sr}} = (1 - L_{sr}) \left( e_{sr} - \sum_{\ell \in r} c_s\ell \right) \tag{3.8}$$

where $c_s\ell(s=1, 2, \ldots, S; \ell=1, 2, \ldots, L)$ are the implied costs. Moreover, if $v_s\ell_{;r}$ denotes the thinned load of service type s on route r which is offered to link l, i.e., $$v_s\ell_{;r} = \rho_{sr} \frac{(1 - L_{sr})}{(1 - B_s\ell)} = \rho_{sr} \prod_{m \in r - \{\ell\}} (1 - B_{sm}) \tag{3.9}$$

then the implied costs satisfy the following system of SL linear equations, $$c_{t\ell} = \frac{1}{(1 - B_{t\ell})} \sum_{\sigma,s} \sum_{r \in \mathfrak{R}(s,\sigma): \ell \in r} \frac{\partial B_s\ell}{\partial v_{t\ell}} v_s\ell_{;r} \left( e_{sr} - \sum_{k \in r - \{\ell\}} c_{sk} \right) \tag{3.10}$$

The expression for $\partial B_{s\ell}/\partial v_{t\ell}$ given in (3.7) should be substituted in (3.10).

Note, from (3.3), that the thinned load of service type s offered to link l is $$v_s\ell = \sum_{\sigma} \sum_{r \in \mathfrak{R}(s,\sigma): \ell \in r} v_s\ell_{;r} \tag{3.11}$$

Also note that the fixed point equations are independent of the equations for the implied costs, while the coefficients of the latter depend on the solution of the former. Specifically, $\{B_t\ell\}$, $\{\partial B_s\ell/\partial v_t\ell\}$ and $\{v_s\ell_{;r}\}$ in (3.10) are obtained from the solution of the fixed point equations.

It can be seen that the complexity of an exact solution for the system of equations in (3.10) is $O(S^3L^3)$.

The sensitivity of loss on links with respect to the link capacity is also of interest. Using linear interpolation, the following sensitivity relationship can be defined:

$$\frac{\partial L_s}{\partial C\ell}(d\ell, v\ell, C\ell) \triangleq \frac{1}{d_{t\ell}}[L_s(d\ell, v\ell, C\ell) - L_s(d\ell, v\ell, C\ell - d_{t\ell})] \tag{3.12}$$

Then, by extending the approach of Kelly ["Fixed point models of loss networks," id.], it is shown in the inventor's referenced contemporary article that $$c_{t\ell} = d_{t\ell} \frac{\partial W}{\partial C\ell} \tag{3.13}$$

which gives an alternate interpretation of the implied costs.

4. Single Link Network Analysis

As a developmental step toward the asymptotic approximation methodology of the invention for finding a solution to the network equations of Section 3, the results for an exact analysis of a single link network are first stated, and then a uniform asymptotic approximation (UAA) is applied to simplify the analysis. In Section 5, following, the UAA is applied to networks with more than one link. It is believed that the structural forms of the results obtained with this simplified case are insightful and suggest the generalizations to multi-link networks, as developed in the next section.

Because the analysis here is addressed to only a single link network, the link index 1, and the route index r are suppressed throughout this section. Thus, in this section, the offered traffic to the single link network of service type s is $v_s$.

4A. Exact Analysis

The main, exact results are summarized below:

For a single link network, the revenue sensitivities are given by $$\frac{\partial W}{\partial v_s} = (1 - B_s)(e_s - c_s) \qquad (4.1)$$

where the loss probability of type s calls is $$B_s = L_s(d, v, C), \; (s=1, 2, \ldots, S) \qquad (4.2)$$

and the implied costs are $$c_t = \sum_{s=1}^{S} e_s v_s [L_s(d, v, C - d_t) - L_s(d, v, C)],$$

$$(t = 1, 2, \ldots, S) \qquad (4.3)$$

4B. UAA Application

In this subsection, application of the UAA to the loss probabilities in a single link is summarized. It is assumed that $$C \gg 1; \; v_s = O(C), \; (s=1, 2, \ldots, S) \qquad (4.4)$$

where C is an integer. Also $d_s$ (s=1, 2, ..., S) are positive integers, not large relative to C, and the greatest common divisor (g.c.d.) of $d_1, \ldots, d_s$ is assumed to be 1. Define $$F(z) \stackrel{\Delta}{=} \sum_{s=1}^{S} v_s(z^{d_s} - 1) - C \log z; \; V(z) \stackrel{\Delta}{=} \sum_{s=1}^{S} d_s^2 v_s z^{d_s} \qquad (4.5)$$

There is a unique positive solution $z^*$ of $F'(z)=0$, where the prime denotes derivative, so that $$\sum_{s=1}^{S} d_s v_s (z^*)^{d_s} = C, \; z^* > 0 \qquad (4.6)$$

Since $F'(z)$ is strictly monotonic increasing with z, any simple procedure, such as bisection, quickly yields $z^*$.

Let $$b_s = \frac{[1 - z^{*d_s}]}{(1 - z^*)}, \quad z^* \neq 1; \qquad (4.7)$$

$$= d_s, \quad z^* = 1$$

and $$B = \frac{e^{F(z^*)}}{M \sqrt{2\pi V(z^*)}} \qquad (4.8)$$

where $$M = \frac{1}{2} Erfc[sgn(1 - z^*) \sqrt{-F(z^*)}] + \qquad (4.9)$$

$$\frac{e^{F(z^*)}}{\sqrt{2\pi}} \left[ \frac{1}{\sqrt{V(z^*)} (1 - z^*)} - \frac{sgn(1 - z^*)}{\sqrt{-2F(z^*)}} \right], \; z^* \neq 1$$

$$M = \frac{1}{2} \left\{ 1 + \frac{1}{\sqrt{2\pi V(1)}} \left[ 1 + \frac{1}{3V(1)} \sum_{s=1}^{S} d_s^3 v_s \right] \right\} \; z^* = 1 \qquad (4.10)$$

and the complementary error function is given by $$Efrc(y) = \frac{2}{\sqrt{\pi}} \int_{y}^{\infty} e^{-x^2} dx \qquad (4.11)$$

Then, asymptotically, $$B_s \sim b_s B, \; (s=1, 2, \ldots, S) \qquad (4.12)$$

These approximations hold whether $0 < z^* < 1$, $z^* \approx 1$ or $z^* > 1$, corresponding to the overloaded, critical and underloaded regimes, respectively. An analogous approximation to the derivative of $B_s$ with respect to $v_t$ gives the following proposition Let $$a_t = \frac{(z^*)^{d_t}}{1 - B_t} - 1 \qquad (4.13)$$

Then, $$L_s(d, v, C - d_t) - L_s(d, v, C) = \frac{1}{(1 - B_t)} \frac{\partial B_s}{\partial v_t} \sim a_t B_s \qquad (4.14)$$

Note that the complexity of calculating $B_s$ and $\partial B_s / \partial v_1$ is O(1), i.e., bounded, fixed as $C \to \infty$. Moreover, the product forms in (4.12) and (4.14), which are specific to UAA, are critical for the reduction in complexity of computing loss and implied costs in networks.

If (4.12) and (4.14) are used in (4.3), asymptotic approximations to the implied costs in a single link network are obtained, $$c_t \sim a_t \xi,$$

where $$\xi = \sum_{s=1}^{S} e_s v_s B_s \sim B \sum_{s=1}^{S} e_s v_s b_s \qquad (4.15)$$

The requirement that the g.c.d. of $d_1, \ldots, d_s$ be 1 is quite important and must be taken into consideration if some of the elements of $v = (v_1, \ldots, v_s)$ are zero. To express this constraint algebraically, assume that $v_s > 0$, $1 \leq s \leq K$ and $v_s = 0$, $K+1 \leq s \leq S$, and that the g.c.d. of $d_1, \ldots, d_k$ is g. Let $$\hat{C} = \lfloor C/g \rfloor; \; \hat{d}_s = \lfloor C/g \rfloor - \lfloor (C - d_s)/g \rfloor, \; 1 \leq s \leq S \qquad (4.16)$$

Then, if C and d are replaced by $\hat{C}$ and $\hat{d}$, the UAA applied to $B_s$ holds for $1 \leq s \leq S$, and the analogous approximations to $\partial B_s / \partial v_t$ hold if $1 \leq s \leq K$, or $1 \leq t \leq K$. The latter suffice as far as the equations for the implied costs.

5. Network Analysis Based On UAA

With the groundwork laid in Sections 3 and 4, it is straightforward to describe the fixed point equations and the equations for the implied costs for the network, which are obtained by UAA.

5A. Fixed Point Equations

The fixed point equations for the network are given in (3.4). The function $\Psi$ is unchanged and defined by (3.3). The function $\Psi_l$ which maps $v_l$ to $B_l$ is, of course, quite different if UAA is used for link analyses. The procedure is given in Equations (4.5)–(4.12) (with re-introduction of the link index). Specifically, the functions $F_l(z)$ and $V_l(z)$ are defined in (4.5), the point $zl^*$ where the minimum $Fl(zl^*)$ occurs is calculated, $b_{sl}$ and $Bl$ are calculated as in (4.7) and (4.8), and finally $$B_{sl} = b_{sl} B_l.$$

In summary, the above procedure defines the function $$B_s l = U_s l(v_l), \; (s=1, 2, \ldots, S; \; l=1, 2, \ldots, L) \qquad (5.1)$$

which contrasts with (3.4a).

The iterative, successive approximations procedure for solving the fixed point equations, which is described in (3.5), is also used here. Since a network design and optimization problem requires many network solutions, the reduction of complexity in analyzing a single link from O(C) to O(1) translates to a very substantial reduction of the numerical burden.

5B. Implied Costs

Equation (3.10) gives the system of linear equations satisfied by the implied costs. In (3.10) a substitution of the expression obtained by UAA is made, which is given in (4.14), $$\frac{1}{(1-B_t\ell)} \frac{\partial B_s\ell}{\partial v_{t\ell}} = a_{t\ell} B_s\ell \quad (5.2)$$

where $$a_{t\ell} = \frac{(z_\ell^*)^{d_{t\ell}}}{(1-B_{t\ell})} - 1 \quad (5.3)$$

This gives $$c_{t\ell} = a_{t\ell} \sum_{\sigma,s} \sum_{r \in \mathfrak{R}(s,\sigma):\ell \in r} v_{s\ell;r} B_{s\ell} \left( e_{sr} - \sum_{k \in r-\{\ell\}} c_{sk} \right) \quad (5.4)$$

Now define $$\xi_\ell \stackrel{\Delta}{=} \sum_{\sigma,s} \sum_{r \in \mathfrak{R}(s,\sigma):\ell \in r} v_{s,\ell;r} B_{s\ell} \left( e_{sr} - \sum_{k \in r-\{\ell\}} c_{sk} \right) \quad (5.5)$$

Note that for all $t(1 \leq t \leq S)$ and $\ell(1 \leq \ell \leq L)$, $$c_t\ell = a_t \ell \xi_\ell \quad (5.6)$$

Now (5.6) is introduced in (5.5) to obtain $$\xi_\ell = \sum_{\sigma,s} \sum_{r \in \mathfrak{R}(s,\sigma):\ell \in r} v_{s\ell;r} B_{s\ell} \left( e_{sr} - \sum_{k \in r-\{\ell\}} a_{sk}\xi_k \right) \quad (5.7)$$

Equation (5.7) is a complete system of equations in $\{\xi\ell\}$. The parameters in this system of equations, namely, $\{v_s\ell_{;r}\}$, $\{B_s\ell\}$ and $\{a_{sk}\}$ are all obtained directly from the solution of the fixed point equations in Section 5A. Equation (5.7) has the property of being a system of only L linear equations. Once the solution of (5.7) has been obtained then all the implied costs $\{c_t\ell\}$ are obtained from (5.6). This procedure for obtaining the implied costs has complexity $O(L^3)$, and its independence from the number of services constitutes a major advantage of the method of the invention.

6. Hybrid System of Network Equations

In some non-trivial number of cases, networks will be expected to have some links which are not large and therefore not amendable to an asymptotic analysis, even though most links will be suitable for application of the UAA. A procedure for handling such cases is therefore provided as a further embodiment of the invention. The procedure, a hybrid of exact and asymptotic analyses, gives closed systems of equations for the blocking probabilities as well as the implied costs. Let $\mathcal{L}_E \triangleq$ set of links which are subject to exact analysis, and $\mathcal{L}_A \triangleq$ set of links which are subject to UAA.

Each link is an element of one of these sets.

Consider first the system of linear equations for the implied costs. From (5.5) and (5.6), for $\ell \in \mathcal{L}_A$, $$\xi_\ell = \sum_{\sigma,s} \sum_{r \in \mathfrak{R}(s,\sigma):\ell \in r} v_{s\ell;r} B_{s\ell} \left[ e_{sr} - \sum_{k \in \mathcal{L}_E \cap (r-\{\ell\})} c_{sk} - \sum_{k \in \mathcal{L}_A \cap (r-\{\ell\})} a_{sk}\xi_k \right] \quad (6.1)$$

and $c_t\ell = a_t\ell\xi_\ell, 1$. For $\ell \in \mathcal{L}_E$, from (3.7) and (3.10), $$c_t\ell = \sum_{\sigma,s} \sum_{r \in \mathfrak{R}(s,\sigma):\ell \in r} \{L_s(d_\ell, v_\ell, C_\ell - d_{t\ell}) - L_s(d_\ell, v_\ell, C_\ell)\} v_{s\ell;r} \times \left[ e_{sr} - \sum_{k \in \mathcal{L}_E \cap (r-\{\ell\})} c_{sk} - \sum_{k \in \mathcal{L}_A \cap (r-\{\ell\})} a_{sk}\xi_k \right] \quad (6.2)$$

Note that (6.1) and (6.2) form a complete set of equations in $\xi_\ell (\ell \in \mathcal{L}_A)$ and $c_s\ell (\ell \in \mathcal{L}_E; s=1, 2, \ldots, S)$.

The above idea extends naturally to a hybrid system of nonlinear fixed point equations for the blocking probabilities. In (3.4), $$B_s\ell = U_s\ell(v_\ell), \quad \ell \in \mathcal{L}_A \quad (6.3a)$$

$$= \Phi_s\ell(v_\ell), \quad \ell \in \mathcal{L}_E \quad (6.3b)$$

where $U_s\ell$ is defined in (5.1). As before, $$v = \Psi(B).$$

The iterative method of successive approximations applies in a straightforward manner.

It is to be noted that detailed derivation of various formulas and equations appearing in the preceding four sections, as well as additional numerical results on the accuracy of the asymptotic formulas, are given in the above referenced contemporaneous article of the inventors [D. Mitra, J. A. Morrison, and K. G. Ramakrishnan, "Unified approach to multirate ATM network design and optimization," To be published November, 1995].

7. Flow Bounds

The goal of the methodology of the invention is to maximize network performance, or, in a preferred embodiment, its proxy "network revenue". The network revenue function (2.4) is generally not concave. To calibrate the quality of the solutions obtained by the procedures for maximizing revenue, it is highly desirable to have bounds. The simplest upper bound is based on stripping the traffic processes of their stochasticity, i.e., by considering such processes to be deterministic fluid or flow processes, which have rates uniform over time. In this framework network revenue is maximized by solving a multirate, multicommodity maximum-flow problem, which is a general linear programming problem. The solution to this problem, denoted by $W_F$, is an upper bound on $W^*$, the maximum network revenue obtained from the solution of the problem (2.5).

The flow problem is specified thus:

$$\max W_F = \sum_{\sigma,s} \sum_{r \in \mathfrak{R}(s,\sigma)} e_{sr} x_{sr} \quad (7.1)$$

subject to $$\left. \begin{array}{l} \sum_{r \in \mathfrak{R}(s,\sigma)} x_{sr} \leq \Lambda_{s\sigma}/\mu_{s\sigma} \quad \forall s, \forall \sigma \\ \sum_{\sigma,s} \sum_{r \in \mathfrak{R}(s,\sigma):\ell \in r} d_{s\ell} x_{sr} \leq C_\ell \quad \forall \ell \\ x_{sr} \geq 0 \quad \forall s, \forall r \end{array} \right\} \quad (7.2)$$

Let $W^*_F$ denote the solution to (7.1). Then $$W^* \leq W^*_F \quad (7.3)$$

where $W^*$ is the solution to the problem in (2.4) and (2.5).

8. Adaptation Methodology

The equations for the implied costs in the general hybrid form, (6.1) and (6.2), may be put in the form $$Ax = y \quad (8.1)$$

where the elements of x are $\xi\ell(\ell \in \mathcal{L}_A)$ and $c_s\ell(\ell \in \mathcal{L}_E)$; s=1, 2, ..., S). It is shown in Section 6 that all the implied costs may be obtained from x. Equation (8.1) has the important property that y>0 and A≧0 (element-wise). Also, x≧0 from the physical interpretation of the implied costs. The nonnegativity of the system of linear equations (8.1) is the basis of an iterative algorithm for its solution. The algorithm has several attractions, and one of particular note is that it is well-suited for network optimization by steepest ascent procedures in which (8.1) needs to be solved repeatedly for (A,y) not greatly different from the preceding instance. By starting the iterative procedure at the preceding solution, the number of iterations is reduced, sometimes quite substantially. This has obvious benefits in real-time applications, such as the adaptation of the logical network of virtual paths to changing traffic conditions.

The adaption algorithm (for adapting the basic methodology or the invention to changing traffic conditions) is an application of the EM algorithm. That EM algorithm has been extensively described by Vardi and Lee [Y. Vardi and D. Lee, "From image deblurring to optimal investments: maximum likelihood solutions for positive linear inverse problems," *J. R. Statist. Soc. B*, 55(3):569–612, 1993; Y. Vardi, "Applications of the EM algorithm to linear inverse problems with positivity constraints," *Preprint*, 1994], and salient observations from those papers are briefly recapitulated here. First, by appropriate scaling (8.1) may be put into a suitable form for statistical inference, wherein x and y are probability vectors, i.e., with nonnegative elements which sum to unity, and the column sums of A are unity. To establish an analogy between solving (8.1) and estimation from incomplete data, consider the statistical model in which X, Y|X and Y are distributed as multinomials with parameters x, $A_x$ (column x of A) and y. The analogy is completed by considering (X, Y) as the "complete" data and its projection Y as the "incomplete" (observed) data. The EM algorithm may now be applied to this canonical estimation algorithm. The sequence generated by the iterative algorithm always converges to a point which minimizes the Kullback-Liebler information divergence between the iterated and target probability vectors. Moreover, the convergence is monotone in the sense that the distance is strictly decreasing, except on convergence. Finally, the nonnegativity constraints are satisfied throughout the procedure.

The EM algorithm for solving (8.1) is $$x_i^{(n+1)} = x_i^{(n)} \sum_j \frac{\alpha_{ij}}{\sum_k A_{jk} x_k^{(n)}}, \quad (n = 0, 1, \ldots) \quad (8.2)$$

where $\alpha_{ji} = y_j A_{ji}/\Sigma_k A_{ki}$. The initial values $x_i^{(0)}$ are positive and otherwise arbitrary.

9. TALISMAN Software Embodiment of Invention

A software system has been developed which embodies the above-described method of the invention for solving multi-layered network design problems. That software system is designated TALISMAN (Tool for AnaLysIs and Synthesis of Multirate ATM Networks). In a present embodiment, TALISMAN is written in C++ and is modularized to reflect the layered nature of the methodology of the invention and its analytic structure. At layer 1, the basic link level analysis of loss probabilities and their partial derivatives is carried out. Layer 2 implements the shadow cost solutions of the preferred embodiment of the invention and the sensitivity calculations with respect thereto. Layer 3 implements the optimization algorithm using the results of Layers 1 and 2.

Figure 3:
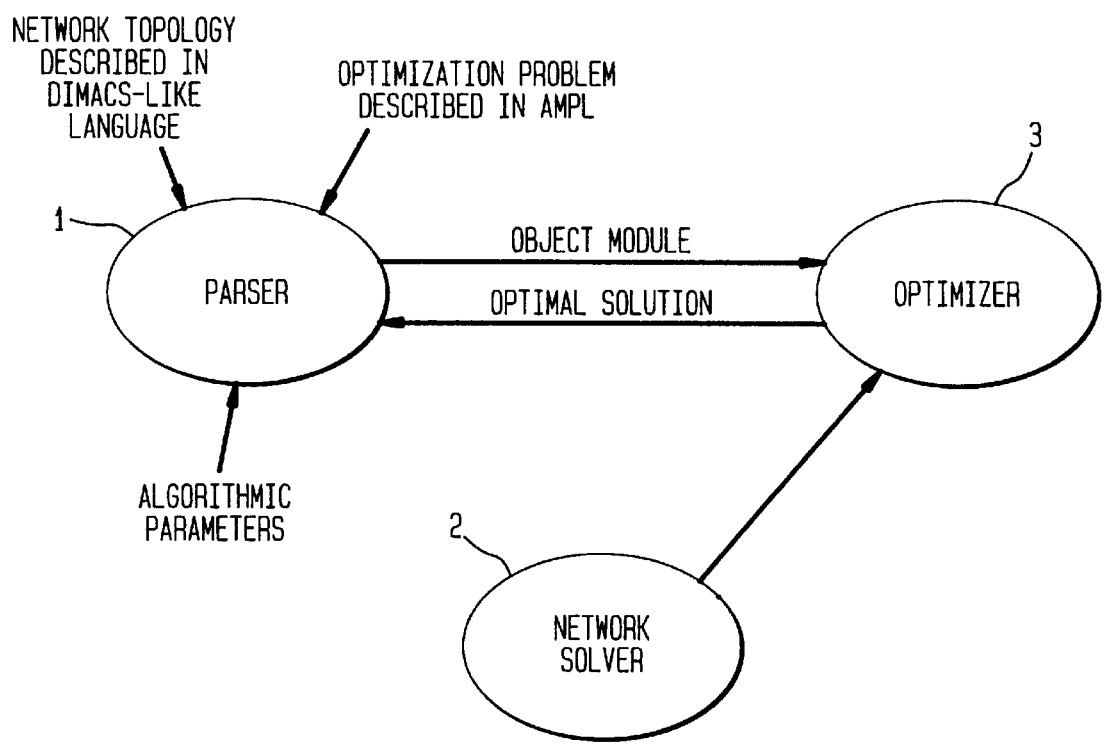
FIG. 3 depicts the architectural structure for a software embodiment of the invention.

The software architecture of TALISMAN is depicted in FIG. 3. That architecture consists of three cooperating UNIX® processes. The parser process initially reads the network topology file for a network being operated on and parses the various network description statements. It then compiles the network topology file into an object file that encodes the topology more compactly. Theparser process also reads a specs file, which contains algorithmic parameters that influence the solution strategies in all the layers of TALISMAN. In a generalized version of TALISMAN, the parser process also reads an ampl program, which encodes the optimization problem that TALISMAN is required to solve. However, in the specific version of TALISMAN addressed to the preferred embodiment of the method of the invention, the optimization problem is implicit, and thus this third input is absent. The parser process passes the object module, the algorithmic parameters and the optimization problem (in the generalized version), to the optimizer process. This process represents the third layer of TALISMAN. The functionality of the optimizer process depends on the version of TALISMAN employed. For the version of TALISMAN addressed to the preferred embodiment of the methodology of the invention herein, referred to hereafter as TALISMAN-LD (for Logical Design), the optimizer process implements the revenue maximization process of the inventive methodology. The pseudo code for the optimization algorithm applied in TALISMAN-LD was shown above at Section 2A.

At each iteration of the optimization algorithm, it is necessary to solve for the link level blocking probabilities and their partial derivatives, given the current routing (i.e., given the current $\rho_{s,r}$). The network solver process is called by the optimizer process whenever a network has to be solved, passing to it

- the object module
- the current traffic stream values $\rho_{s,r}$, and
- the algorithmic parameter values The network solver process implements the layers 2 and 3 of the problem structure for the methodology of the invention.

Figure 4A:
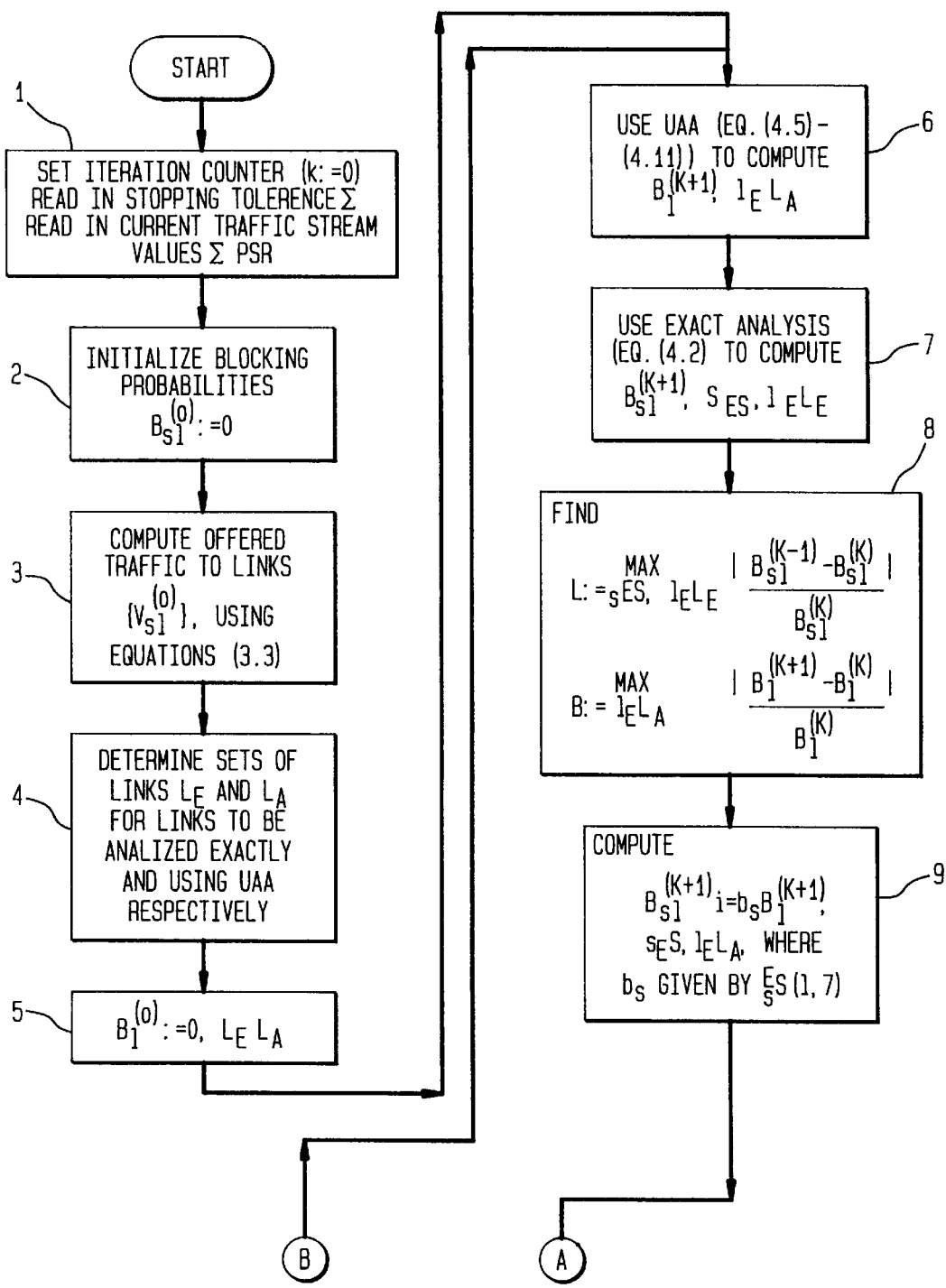
FIG. 4 shows, in flow-chart form, implementation steps for a software embodiment of the invention.
Figure 4B:
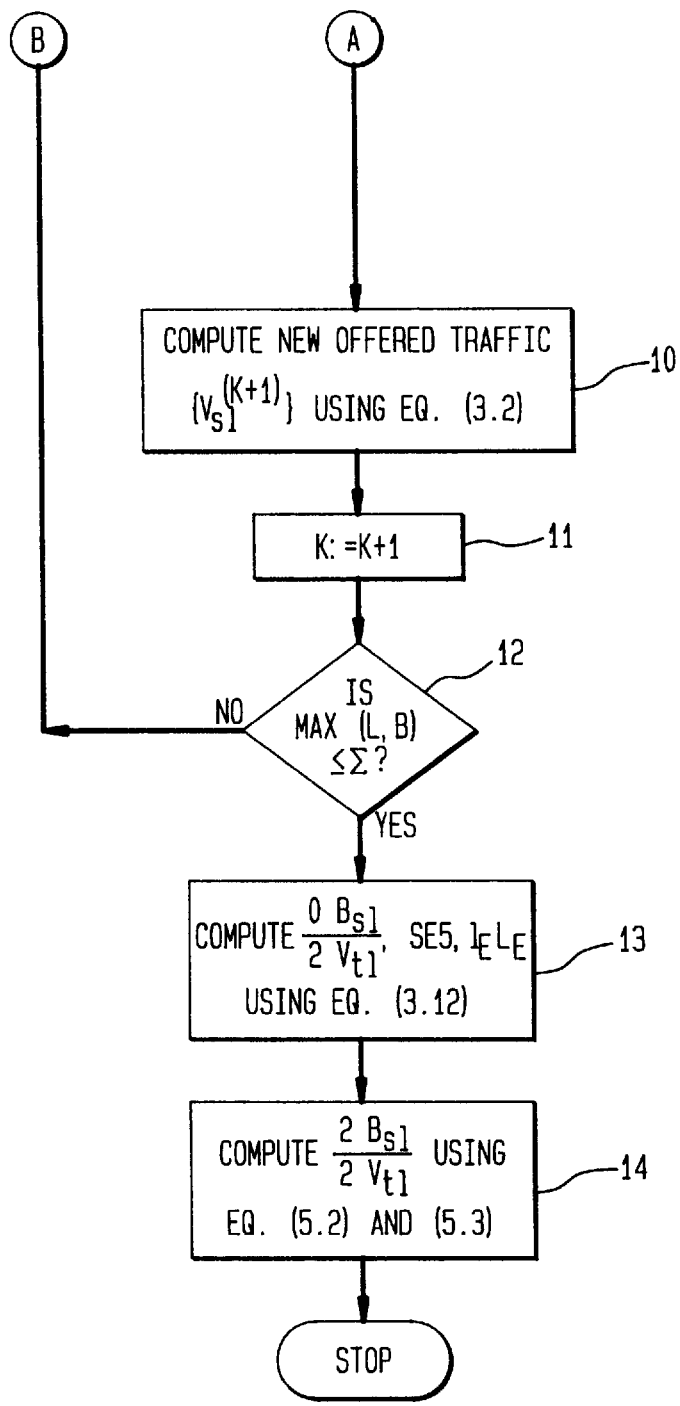

A flow chart illustrating the implementation of layer 3, the link layer, is shown in FIG. 4. This layer implements the fixed point equations given by equation (3.5) in Section 3 above. Initially an iteration counter k is set to 0. Then the current offered traffic streams for each route ($\rho_{s,r}$) is read in, along with the stopping tolerance $\epsilon$. In step 2, all blocking probabilities are set to 0. In step 3, the current offered traffic to each link in each service class, assuming no thinning, is computed. Using this set of link offered traffic measures. along with the link bandwidth, a determination is made as to the choice of the solution technique. This determination partitions the link set $\mathcal{L}$ into two subsets, $\mathcal{L}_E$ and $\mathcal{L}_A$, corresponding to the links that are to be analyzed exactly and those that are to which the asymptotic analysis approach is applied, respectively. In step 5, the common term used in the asymptotic analysis, namely, B$\ell$, is initialized to 0. This completes the initialization phase. In the iterative phase of the algorithm, the common terms B$\ell$ for $\ell \in \mathcal{L}_A$ are computed and then $B_s\ell$ for s∈S and $\ell \in \mathcal{L}_E$ are computed. These values of B$\ell$ and $B_s\ell$ have a superscript of (k+1) indicating a correspondence to the next iteration. In step 8, the largest relative change in blocking probabilities is determined. Step 9 computes the blocking probabilities for the asymptotic links for each service class, in accordance with equation (4.7). Step 10 computes the new offered traffic for the next iteration using equation (3.2). Step 11 then increments the iteration counter by one. Step 12 compares this quantity with the stopping criterion, and loops back to step 6 if convergence is not achieved. Otherwise the iterative process is terminated. With the converged values of $B_s\ell$, one can now compute the partials of blocking probabilities, as shown in steps 13 and 14. This completes the layer 3 implementation.

Layer 2 implementation involves solving for the shadow costs. Initially, the sparse matrix of the linear system of equations ((6.1) and (6.2) of Section 6 preceding) is composed. Then a decision is made as to whether the EM algorithm or the direct factorization algorithm is to be used for solving the linear equation system. In the latter case, the matrix is factored into an upper triangular and a lower triangular matrix. The solution of the linear equation system is then obtained using a forward substitution followed by a back substitution. For the former case, the EM iterative algorithm is called, optionally with the starting solution, to solve the linear equation system. After completion of the solution of the linear equation system, the objective function and the gradient are evaluated and passed back to the optimizer process.

10. Empirical Application of Invention

A number of computational experiments have been undertaken by the inventors, using the TALISMAN software system, to apply the methodology of the invention to a hypothetical network. The description of those experiments and results therefrom are provided herein in several subsections. In Section 10A the basic facts of the network on which the experiments were conducted are presented. In Section 10B the results from the revenue maximization problem for three different route sets are shown, those route sets being parameterized by the number of hops in the admissible routes. Section 10B also gives the revenue bounds obtained by solving the corresponding flow problem. Finally, Section 10C gives results on the number of iterations of the EM algorithm, which are required to compute all the implied costs as the traffic between pairs of nodes (selected for the heaviness of their mutual traffic) is changed by steps of 1 percent.

10A Experimental Network

Figure 2:
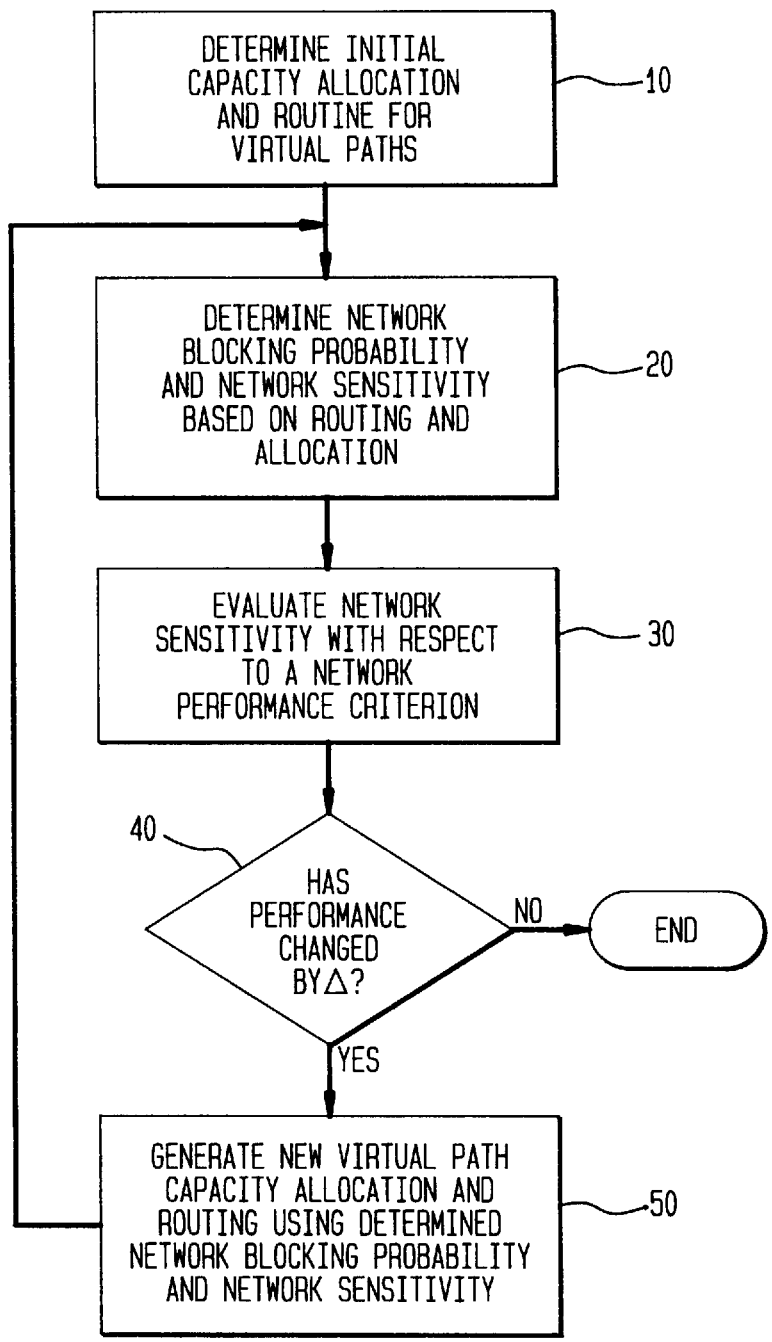
FIG. 2 depicts an embodiment of the invention in flow-chart form.
Figure 5:
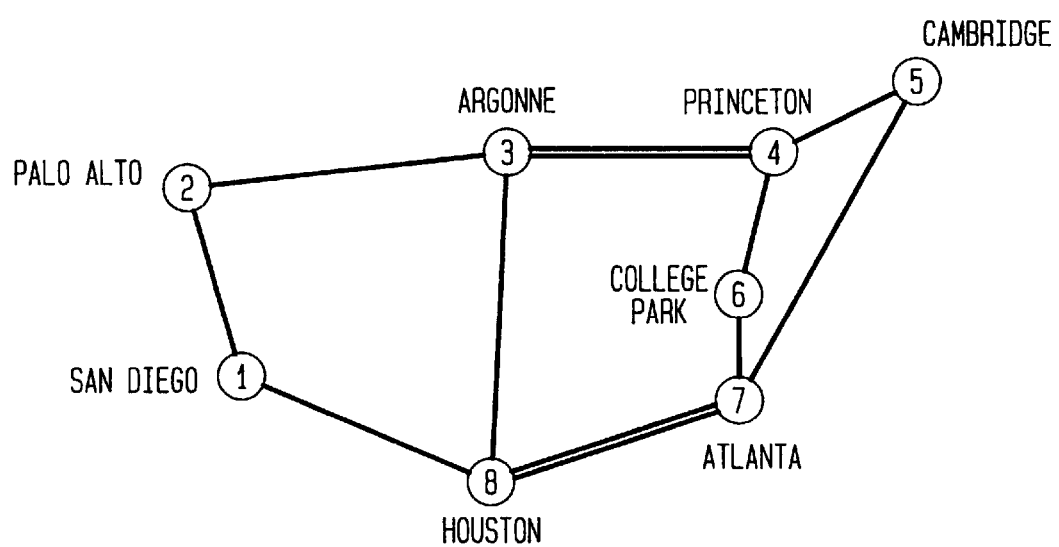
FIG. 5 depicts an exemplary network used to illustrate simulated results for operation of the methodology of the invention.

This hypothetical network, which is depicted in FIG. 5, has 8 nodes (N=8) and, as shown in FIG. 2, 10 pairs of nodes are directly connected. Each such node pair is connected by two unidirectional links carrying traffic in opposite directions. Thus the network has 20 unidirectional links (L=20). The typical bandwidth of a unidirectional link is 45 Mbps, with the exceptions being the links in both directions connecting Argonne (3) and Princeton (4), and also Houston (8) and Atlanta (7), which have bandwidths of 90 Mbps.

There are 6 services (S=6). The transmission rates associated with these services are 16, 48, 64, 96, 384 and 640 Kbps respectively, uniformly over all links. Service 1 may be thought of as voice, services 2–5 as data and service 6 as video. It is convenient to rescale and let 16 Kbps be the bandwidth unit. Table 1 gives the service bandwidths in this unit, which then define $d_s \equiv d_s \ell (s=1, 2, \ldots, S)$. Also, link bandwidths of 45 Mbps and 90 Mbps translate to 2812 and 5625 units, respectively. Hence $C\ell\epsilon\{2812, 5625\}$ for $\ell=1, 2, \ldots, L$.

| services, s | 1 (voice) | 2 (data 1) | 3 (data 2) | 4 (data 3) | 5 (data 4) | 6 (video) |
|---|---|---|---|---|---|---|
| rates (Kbps) | 16 | 48 | 64 | 96 | 384 | 640 |
| $d_s$ | 1 | 3 | 4 | 6 | 24 | 40 |

Table 1: Service bandwidth $d_s$ (unit=16 Kbps), where $d_s \equiv d_s \ell$

To keep the description of exogenous offered traffic intensities compact, a base traffic intensity matrix T, which is N×N, and a multiplier m, for service s (s=1, 2, ..., S) are employed. Hence, $m_s T_{ij}$ gives the offered traffic intensity of service s from node i to node j, i.e., $\Lambda_{s\sigma}/\mu_{s\sigma}$ where $\sigma=(i, j)$. The unit of measurement for traffic intensity is calls. The matrix T is given in Table 2 and the multipliers $\{m_s\}$ are in Table 3. Note the asymmetry in the offered traffic. Also, $$T \stackrel{\Delta}{=} \sum_{i,j} T_{ij} = 527 \tag{10.1}$$

TABLE 2

| Base traffic intensity matrix T | | | | | | | | |
|---|---|---|---|---|---|---|---|---|
| nodes | 1 | 2 | 3 | 4 | 5 | 6 | 7 | 8 |
| 1 | — | 6 | 7 | 1 | 9 | 5 | 2 | 3 |
| 2 | 7 | — | 24 | 3 | 31 | 15 | 6 | 9 |
| 3 | 8 | 25 | — | 4 | 37 | 18 | 7 | 11 |
| 4 | 1 | 3 | 3 | — | 4 | 2 | 1 | 1 |
| 5 | 11 | 33 | 39 | 5 | — | 24 | 9 | 15 |
| 6 | 5 | 14 | 16 | 2 | 21 | — | 4 | 6 |
| 7 | 2 | 5 | 6 | 1 | 8 | 4 | — | 2 |
| 8 | 3 | 8 | 10 | 1 | 12 | 6 | 2 | — |

TABLE 3

| Offered traffic intensity matrix for service s = $m_s$T | | | | | | |
|---|---|---|---|---|---|---|
| service, s | 1 | 2 | 3 | 4 | 5 | 6 |
| multiplier, $m_s$ | 0.5 | 0.5 | 1.0 | 0.5 | 0.5 | 0.5 |

10B Revenue Maximization, Routing

The results presented here are obtained by exercising the TALISMAN software system, which includes various "expert system" features to automatically select either one of the asymptotic formulas or the exact method of link analysis. Throughout, the revenue earned per carried call per unit time of service s on route r, is established as $$e_{sr} = d_s \tag{10.2}$$

for all r.

The results are for three distinct route sets. In each case the route sets are generated by a simple algorithm, which is described below.

Route sets 1: $\Re(s,\sigma)=\{r|\#$ (hops) in route r is the minimum for the node pair $\sigma\}$
Route sets 2: $\Re(s,\sigma)=\{r|3\geq\#$ (hops) in route r$\}$
Route sets 3: $\Re(s,\sigma)=\{r|4\geq\#$ (hops) in route r$\}$ $\tag{10.3}$ Since the minimum number of hops for all node pairs does not exceed 3, $\Re_1(s,\sigma) \subseteq \Re_2(s,\sigma) \subseteq \Re_3(s,\sigma)$, for all s and σ, where the subscript indexes the method of generating the route sets. In fact, the number of routes thus generated are, respectively, 68, 102 and 160. Also note from (9.3) that for a given origin-destination pair σ, the route set $\Re(s,\sigma)$ is common for all services s.

Table 4 summarizes the results on revenue maximization from TALISMAN and from solving the linear program which gives the flow bound. The table also gives data on blocking. Blocking probabilities are computed on the basis of the offered and carried bandwidth traffic in units of bandwidth (not calls). Thus, the offered and carried bandwidth traffic are given by $\Omega_{offered}$ and $\Omega_{carried}$, respectively, where $$\Omega_{offered} \stackrel{\Delta}{=} \sum_{\sigma,s} d_s(\Lambda_{s\sigma}/\mu_{s\sigma}), \quad (10.4)$$

and $$\Omega_{carried} = \sum_{\sigma,s} \sum_{r \in \Re(s,\sigma)} d_s \rho_{sr}(1 - L_{sr})$$

$\Omega_{offered}$ is readily calculated from (10.1) and Tables 1 and 3:

$$\Omega_{offered} = 21{,}607 \quad (10.5)$$

On account of (10.2) this quantity is also the revenue that may be earned if there is no blocking.

the route sets has the opposite effect, since excessive traffic is offered to long, and therefore inefficient, routes.

As previously noted, the network revenue function is not concave, and therefore the steepest ascent for the Optimization Algorithm given in Section 2 terminates at local maxima, which depend on initial conditions. Thus, the results reported in Table 4 under "Optimal Routing" are the best that were obtained from various initial conditions.

10C Adaptation

Here the results on the performance of the Adaptation algorithm for computing the exact implied costs (see (3.10)) under changing traffic conditions are presented. Three scenarios are considered. In the first scenario the traffic from Palo Alto (2) to Cambridge (5) is incremented in steps of 1 percent (of the base traffic) up to 10 percent for all 6 services. The incremental number of EM iterations is computed that are required for the $L_\infty$ norm of the vector of relative differences in successive iterates to be less than $10^{-4}$. Table 5 gives the results, which shows that at most 3 iterations are required in each instance. This may be calibrated by comparing with the number of iterations of the EM algorithm required to compute all the implied costs starting from arbitrary initial conditions, which is about 23.

TABLE 4

Summary of results from revenue maximations and bounds

| Route Sets | ROUTING: Uniform loading of routes in set | | OPTIMAL ROUTING | | | |
|---|---|---|---|---|---|---|
| | | | Revenue | | Blocking (%) | |
| | Revenue | Blocking (%) | TALISMAN | Flow Bound | TALISMAN | Flow Bound |
| 1 | 19,167 | 11.3 | 20,401 | 21,081 | 5.6 | 2.4 |
| 2 | 19,050 | 11.8 | 21,012 | 21,607 | 2.8 | 0 |
| 3 | 18,065 | 16.4 | 21,026 | 21,607 | 2.7 | 0 |

Table 4 also gives revealing performance benchmarks, also obtained from TALISMAN, for routing based on balancing the offered traffic for each stream (s, σ) uniformly over all routes in the route set $\Re(s,\sigma)$. An important special case has the offered traffic divided uniformly over the routes with the minimum number of hops ("min-hop routing"). In this case the revenue is 19,167 and the blocking is 11.3%. The data in the table shows that performance is substantially improved by optimization and by enlarging the route sets. Note, however, that in the case of uniform loading enlarging

TABLE 5

Implied cost calculations for changing traffic from Palo Alto (2) to Cambridge (5)

| Incremental offered traffic | +1% | +1% | +1% | +1% | +1% | +1% | +1% | +1% | +1% | +1% |
|---|---|---|---|---|---|---|---|---|---|---|
| Incremental EM iterations | 2 | 3 | 3 | 3 | 3 | 3 | 3 | 3 | 3 | 2 |

Table 6 presents results for the second scenario in which traffic from Argonne (3) to Cambridge (5) in all services is decremented in steps of 1 percent (of the base traffic) up to 10 percent. Finally, Table 7 presents results for the composite of the first and second scenarios in which simultaneously traffic from Palo Alto (2) to Cambridge (5) is increased while traffic from Argonne (3) to Cambridge (5) is decreased.

TABLE 6

Implied cost calculations for changing traffic from Argonne (3) to Cambridge (5)

| Incremental offered traffic | −1% | −1% | −1% | −1% | −1% | −1% | −1% | −1% | −1% | −1% |
|---|---|---|---|---|---|---|---|---|---|---|
| Incremental EM iterations | 9 | 10 | 9 | 9 | 10 | 10 | 10 | 10 | 10 | 10 |

TABLE 7

Implied cost calculations for simultaneously changing traffic (%) (Palo Alto to Cambridge, Argonne to Cambridge)

| Incremental offered traffic | (+1, −1) | (+1, −1) | (+1, −1) | (+1, −1) | (+1, −1) | (+1, −1) | (+1, −1) | (+1, −1) | (+1, −1) | (+1, −1) |
|---|---|---|---|---|---|---|---|---|---|---|
| Incremental EM iterations | 9 | 10 | 9 | 9 | 9 | 9 | 10 | 10 | 10 | 10 |

CONCLUSION

A methodology has been provided for multirate ATM network design and optimization which unifies nonasymptotic and asymptotic methods of analyses. The asymptotic techniques are aimed at alleviating the numerical complexity of handling links of large bandwidth in the presence of many services with distinct rates, which are intrinsic features of emerging ATM networks.

Although the present embodiment of the invention has been described in detail, it should be understood that various changes, alterations and substitutions can be made therein without departing from the spirit and scope of the invention as defined by the appended claims. In particular, it is noted that, while the invention has been primarily described in terms of a preferred embodiment based on ATM technology, the method and concept of the invention may be applied with respect to any packet oriented communications network.

We claim:

1. A method for logical network design in a multi-service communications network, said network including a set of switching nodes and a set of connecting links disposed to interconnect at least some of said nodes, comprising the steps of:

determining blocking probabilities of a plurality of services for a subset of said set of links;

determining sensitivities of network performance as a function of offered loads for a plurality of services and transmission rates: and adjusting said network performance based on said sensitivities and said blocking probabilities;

wherein said steps of determining blocking probabilities and determining network performance sensitivities include a computational substep of applying successive asymptotic approximations, said substep operating to reduce computational complexity for said steps.

2. The logical network design method of claim 1 wherein said asymptotic analysis substep includes a Uniform Asymptotic Approximation.

3. The logical network design method of claim 1 wherein said step of determining blocking probabilities includes the establishment of a set of fixed point equations, and a solution of said equations is carried out using said asymptotic analysis substep.

4. The logical network design method of claim 1 wherein said network performance sensitivity determining step includes the establishment of a set of linear equations, and a solution of said equations is carried out using said asymptotic analysis substep.

5. The logical network design method of claim 1 wherein said network performance is defined in terms of network revenue.

6. The logical network design method of claim 1 wherein said step of adjusting network performance is implemented through an iterative application of said steps of determining blocking probabilities and determining network performance sensitivity until a predetermined performance criterion is reached.

7. The logical network design method of claim 1 further including a dynamic bifurcation of said network into a first network portion and a second network portion, wherein said application of said steps of determining blocking probabilities and determining network performance sensitivity to said first portion of said network includes an asymptotic analysis substep, said asymptotic analysis substep not being included in said application of said steps of determining blocking probabilities and determining network performance sensitivity to said second portion of said network.

8. The logical network design method of claim 7 wherein said bifurcation of said network is carried out by assigning a first set of said links comprising said network to said first network portion and a second set of said links comprising said network to said second network portion and wherein said assignment of said network links to said first or said second link sets is related to capacity and loading factors for said network links.

9. The logical network design method of claim 8 wherein said step of adjusting network performance is implemented through an iterative application of said steps of determining blocking probabilities and determining network performance sensitivity, wherein each said iteration provides a capacity factor for each of said links in said network, and said assignment of said links to said first or said second link sets is related to said provided capacity factor, said assignment being adjusted as said link loads change from iteration to iteration.

10. The logical network design method of claim 1 further including an adaptation step for application of said method to changes in traffic loads of a plurality of services and source-destination pairs.

11. The logical network design method of claim 10 wherein said adaptation step effects a re-dimensioning of logical partitions in said logical network in response to said changing traffic conditions.

12. The logical network design method of claim 1 further including a call admission control substep operating to selectively block arriving traffic from entry to said network in accordance with a defined network performance criteria, wherein said selective blocking is determined with respect to service type and source-destination pair.

13. A method of establishing a plurality of virtual paths in a communications network, said communications network being characterized by a set of switching nodes and a set of connecting links wherein each said virtual path is defined in terms of a subset of said set of nodes and a subset of said set of links, comprising the steps of:

determining blocking probabilities of a plurality of services for links included in said plurality of virtual paths;

determining sensitivities of network performance as a function of offered loads for a plurality of services and transmission rates: and selecting routes and allocating capacity for said virtual paths in relation to said offered loads based on said sensitivities and said blocking probabilities;

wherein said steps of determining blocking probabilities and determining network performance sensitivities include a computational substep of applying successive asymptotic approximations, said substep operating to reduce computational complexity for said steps.

14. The method for establishing virtual paths of claim 13 wherein said asymptotic analysis substep includes a Uniform Asymptotic Approximation.

15. The method for establishing virtual paths of claim 13 wherein said step of determining blocking probabilities includes the establishment of a set of fixed point equations, and a solution of said equations is carried out using said asymptotic analysis substep.

16. The method for establishing virtual paths of claim 13 wherein said network performance sensitivity determining step includes the establishment of a set of linear equations, and a solution of said equations is carried out using said asymptotic analysis substep.

17. The method for establishing virtual paths of claim 13 wherein said network performance is defined in terms of network revenue.

18. The method for establishing virtual paths of claim 13 wherein said step of selecting routes for said virtual paths is implemented through an iterative application of said steps of determining blocking probabilities and determining network performance sensitivity until a predetermined performance criterion is reached.

19. The method for establishing virtual paths of claim 13 further including a dynamic bifurcation of said network into a first network portion and a second network portion, wherein said application of said steps of determining blocking probabilities and determining network performance sensitivity to said first portion of said network includes an asymptotic analysis substep, said asymptotic analysis substep not being included in said application of said steps of determining blocking probabilities and determining network performance sensitivity to said second portion of said network.

20. The method for establishing virtual paths of claim 19 wherein said bifurcation of said network is carried out by assigning a first set of said links comprising said network to said first network portion and a second set of said links comprising said network to said second network portion and wherein said assignment of said network links to said first or said second link sets is related to capacity and loading factors for said network links.

21. The method for establishing virtual paths of claim 20 wherein said step of selecting routes for said virtual paths is implemented through an iterative application of said steps of determining blocking probabilities and determining network performance sensitivity, wherein each said iteration provides a capacity factor for each of said links in said network, and said assignment of said links to said first or said second link sets is related to said provided capacity factor, said assignment being adjusted as said link loads change from iteration to iteration.

22. The method for establishing virtual paths of claim 13 further including an adaptation step for application of said method to changes in traffic loads of a plurality of services and source-destination pairs.

23. The method for establishing virtual paths of claim 22 wherein said adaptation step effects a re-dimensioning of said virtual paths in relation to changes in offered load to said network.

24. The method for establishing virtual paths of claim 13 further including a call admission control substep operating to selectively block arriving traffic from entry to said network in accordance with a defined network performance criteria, wherein said selective blocking is determined with respect to service type and source-destination pair.

25. A method for determining virtual path routings and allocation of bandwidth thereto in a communications network, said communications network being characterized by a set of switching nodes and a set of connecting links, comprising the steps of:

determining blocking probabilities and network performance sensitivities of a plurality of services for a subset of said set of connecting links based on offered loads for said plurality of services and a plurality of transmission rates and initial determination of said virtual path routings and bandwidth allocations;

evaluating said network sensitivities with respect to a predetermined network performance criterion;

iteratively applying said determining step using revised virtual path routings and bandwidth allocations until a network performance gradient is less than a selected threshold;

wherein said step of determining blocking probabilities and network performance sensitivities includes a computational substep of applying successive asymptotic approximations, said substep operating to reduce computational complexity for said step.

26. The method for determining virtual path routings and bandwidth allocations of claim 25 wherein said asymptotic analysis substep includes a Uniform Asymptotic Approximation.

27. The method for determining virtual path routings and bandwidth allocations of claim 25 wherein said determination of blocking probabilities includes the establishment of a set of fixed point equations, and a solution of said equations is carried out using said asymptotic analysis substep.

28. The method for determining virtual path routings and bandwidth allocations of claim 25 wherein said determination of network performance sensitivities includes the establishment of a set of linear equations, and a solution of said equations is carried out using said asymptotic analysis substep.

29. The method for determining virtual path routings and bandwidth allocations of claim 25 wherein said evaluation criterion is defined in terms of network revenue.

30. The method for determining virtual path routings and bandwidth allocations of claim 25 further including a dynamic bifurcation of said network into a first network portion and a second network portion, wherein an application of said step of determining blocking probabilities and network performance sensitivity to said first portion of said network includes an asymptotic analysis substep, said asymptotic analysis substep not being included in application of said step of determining blocking probabilities and network performance sensitivity to said second portion of said network.

31. The method for determining virtual path routings and bandwidth allocations of claim 30 wherein said bifurcation of said network is carried out by assigning a first set of said links comprising said network to said first network portion and a second set of said links comprising said network to said second network portion and wherein said assignment of said network links to said first or said second link sets is related to capacity and loading factors for said network links.

32. The method for determining virtual path routings and bandwidth allocations of claim 31 wherein each said iterative application of said determining step provides a capacity factor for each of said links in said network, and said assignment of said links to said first or said second link sets is related to said provided capacity factor, said assignment being adjusted as said link loads change from iteration to iteration.

33. The method for determining virtual path routings and bandwidth allocations of claim 25 further including an adaptation step for application of said method to changes in traffic loads of a plurality of services and source-destination pairs.

34. The method for determining virtual path routings and bandwidth allocations of claim 32 wherein said adaptation step effects a re-dimensioning of said virtual paths in relation to changes in offered load to said network.

35. The method for determining virtual path routings and bandwidth allocations of claim 25 further including a call admission control substep operating to selectively block arriving traffic from entry to said network in accordance with a defined network performance criteria, wherein said selective blocking is determined with respect to service type and source-destination pair.

36. An object-oriented software system for carrying out a network analysis methodology, and having as an output at least one network performance parameter, said software system comprising:
   a parser process for determining and compiling network topology data into an object file;
   a network solver process for determining network blocking probabilities in respect to a plurality of services and network performance sensitivities as a function of offered loads, said network solver process including a computational process for applying successive asymptotic approximations in said network blocking probability and said network performance sensitivity determinations, said substep operating to reduce computational complexity for said determinations; and
   an optimizer process for evaluating a resultant of said network solver process and causing said network process to be iteratively repeated until said resultant satisfies a defined criterion.

37. The software system of claim 36 wherein said parser process further includes a determination of parameters used in said network analysis.

38. The software system of claim 37 wherein said parser process still further includes a determination of data encoding an optimization problem to be solved by said software system.

39. The software system of claim 38 wherein said parser process passes to said optimizer process said object file and any other data determined by said parser process.

40. The software system of claim 36 wherein a set a actions carried out in the operation of said software system are as depicted in the flow diagram of FIG. 4.

41. A software system for implementing the methodology of claim 1 in a digital computer system.

42. A storage means fabricated to contain a set of instructions corresponding to the method of claim 1.

43. A method for logical network design in a multi-service communications network, said network including a set of switching nodes and a set of connecting links disposed to interconnect at least some of said nodes, comprising the steps of:
   determining blocking probabilities of a plurality of services for a subset of said set of links;
   determining sensitivities of network performance as a function of offered loads for a plurality of services and transmission rates:
   adjusting said network performance based on said sensitivities and said blocking probabilities; and
   dynamically bifurcating said network into a first network portion and a second network portion;
   wherein said application of said steps of determining blocking probabilities and determining network performance sensitivity to said first portion of said network includes an asymptotic analysis substep, said asymptotic analysis substep not being included in said application of said steps of determining blocking probabilities and determining network performance sensitivity to said second portion of said network.

44. The logical network design method of claim 43 wherein said bifurcation of said network is carried out by assigning a first set of said links comprising said network to said first network portion and a second set of said links comprising said network to said second network portion and wherein said assignment of said network links to said first or said second link sets is related to capacity and loading factors for said network links.

45. The logical network design method of claim 44 wherein said step of adjusting network performance is implemented through an iterative application of said steps of determining blocking probabilities and determining network performance sensitivity, wherein each said iteration provides a capacity factor for each of said links in said network, and said assignment of said links to said first or said second link sets is related to said provided capacity factor, said assignment being adjusted as said link loads change from iteration to iteration.

46. A method of establishing a plurality of virtual paths in a communications network, said communications network being characterized by a set of switching nodes and a set of connecting links wherein each said virtual path is defined in terms of a subset of said set of nodes and a subset of said set of links, comprising the steps of:
   determining blocking probabilities of a plurality of services for links included in said plurality of virtual paths;
   determining sensitivities of network performance as a function of offered loads for a plurality of services and transmission rates:
   selecting routes and allocating capacity for said virtual paths in relation to said offered loads based on said sensitivities and said blocking probabilities; and
   further including a dynamic bifurcation of said network into a first network portion and a second network portion, wherein said application of said steps of determining blocking probabilities and determining network performance sensitivity to said first portion of said network includes an asymptotic analysis substep, said asymptotic analysis substep not being included in said application of said steps of determining blocking probabilities and determining network performance sensitivity to said second portion of said network.

47. The method for establishing virtual paths of claim 46 wherein said bifurcation of said network is carried out by assigning a first set of said links comprising said network to said first network portion and a second set of said links comprising said network to said second network portion and wherein said assignment of said network links to said first or said second link sets is related to capacity and loading factors for said network links.

48. The method for establishing virtual paths of claim 47 wherein said step of selecting routes for said virtual paths is implemented through an iterative application of said steps of determining blocking probabilities and determining network performance sensitivity, wherein each said iteration provides a capacity factor for each of said links in said network, and said assignment of said links to said first or said second link sets is related to said provided capacity factor, said assignment being adjusted as said link loads change from iteration to iteration.

49. The method for establishing virtual paths of claim 46 further including an adaptation step for application of said method to changes in traffic loads of a plurality of services and source-destination pairs.

50. The method for establishing virtual paths of claim 49 wherein said adaptation step effects a re-dimensioning of said virtual paths in relation to changes in offered load to said network.

51. A method for determining virtual path routings and allocation of bandwidth thereto in a communications network, said communications network being characterized by a set of switching nodes and a set of connecting links, comprising the steps of:

determining blocking probabilities and network performance sensitivities of a plurality of services for a subset of said set of connecting links based on offered loads for said plurality of services and a plurality of transmission rates and initial determination of said virtual path routings and bandwidth allocations;

evaluating said network sensitivities with respect to a predetermined network performance criterion;

iteratively applying said determining step using revised virtual path routings and bandwidth allocations until a network performance gradient is less than a selected threshold; and further including a dynamic bifurcation of said network into a first network portion and a second network portion, wherein an application of said step of determining blocking probabilities and network performance sensitivity to said first portion of said network includes an asymptotic analysis substep, said asymptotic analysis substep not being included in application of said step of determining blocking probabilities and network performance sensitivity to said second portion of said network.

52. The method for determining virtual path routings and bandwidth allocations of claim 49 wherein said bifurcation of said network is carried out by assigning a first set of said links comprising said network to said first network portion and a second set of said links comprising said network to said second network portion and wherein said assignment of said network links to said first or said second link sets is related to capacity and loading factors for said network links.

53. The method for determining virtual path routings and bandwidth allocations of claim 50 wherein each said iterative application of said determining step provides a capacity factor for each of said links in said network, and said assignment of said links to said first or said second link sets is related to said provided capacity factor, said assignment being adjusted as said link loads change from iteration to iteration.

54. An object-oriented software system for carrying out a network analysis methodology, and having as an output at least one network performance parameter, said software system comprising:

a parser process for determining and compiling network topology data into an object file;

a network solver process for determining network blocking probabilities in respect to a plurality of services and network performance sensitivities as a function of offered loads; and an optimizer process for evaluating a resultant of said network solver process and causing said network process to be iteratively repeated until said resultant satisfies a defined criterion;

wherein a set of actions carried out in operation of said software system are as depicted in the flow diagram of FIG. 4.

* * * * *